(12) United States Patent
Otsuka et al.

(10) Patent No.: US 9,658,908 B2
(45) Date of Patent: May 23, 2017

(54) FAILURE SYMPTOM REPORT DEVICE AND METHOD FOR DETECTING FAILURE SYMPTOM

(71) Applicant: FUJITSU LIMITED, Kawasaki-shi, Kanagawa (JP)

(72) Inventors: Hiroshi Otsuka, Kawasaki (JP); Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 14/505,949

(22) Filed: Oct. 3, 2014

(65) Prior Publication Data
US 2015/0113337 A1     Apr. 23, 2015

(30) Foreign Application Priority Data

Oct. 23, 2013  (JP) ................................. 2013-219914
Sep. 18, 2014  (JP) ................................. 2014-189926

(51) Int. Cl.
| | | |
|---|---|---|
| *G06F 11/00* | (2006.01) | |
| *G06F 11/07* | (2006.01) | |
| *H04L 12/26* | (2006.01) | |
| *H04L 12/24* | (2006.01) | |

(52) U.S. Cl.
CPC ........ *G06F 11/0709* (2013.01); *G06F 11/076* (2013.01); *H04L 41/147* (2013.01); *H04L 43/065* (2013.01)

(58) Field of Classification Search
CPC ............................ G06F 11/0709; G06F 11/076
See application file for complete search history.

(56) References Cited

U.S. PATENT DOCUMENTS 8,595,556 B2 * 11/2013 Caffrey ............... G06F 11/0709
                                                          714/33
2008/0004841 A1   1/2008  Nakamura
2009/0217099 A1   8/2009  Kato
(Continued)

FOREIGN PATENT DOCUMENTS

JP          7-105367        4/1995
JP       2006-146668        6/2006
(Continued)

*Primary Examiner* — Bryce Bonzo
*Assistant Examiner* — Katherine Lin
(74) *Attorney, Agent, or Firm* — Oblon, McClelland, Maier & Neustadt, L.L.P.

(57) ABSTRACT

A failure symptom report device includes a processor configured to receive a message output from a system and related to configuration equipment of the system, and detect presence or absence of each of failure alerts. The failure alerts are generated in response to the received message on basis of detection conditions respectively. The detection conditions are respectively defined in accordance with different characteristics. The processor is configured to associate an actually occurred failure with a combination of the detected presence or absence of each of the failure alerts, count performance of failure prediction for each combination of the detected presence or absence of each of the failure alerts, and determine presence or absence of a failure symptom on basis of the counted performance of failure prediction and a combination of presence or absence of each of the failure alerts generated in response to a currently received message.

6 Claims, 14 Drawing Sheets

(56) References Cited

U.S. PATENT DOCUMENTS

2011/0209010 A1    8/2011   Morimura et al.
2012/0151282 A1    6/2012   Watanabe et al.

FOREIGN PATENT DOCUMENTS

| JP | 2008-9842 | 1/2008 |
| JP | 2009-199533 | 9/2009 |
| JP | 2011-76293 | 4/2011 |
| JP | 2012-123694 | 6/2012 |

\* cited by examiner

FIG. 4

| ID 1001 | TYPE 1002 | DATE 1003 | TITLE 1004 | CI id 1005 | ... 1011 |
|---|---|---|---|---|---|
| F0001 | 1 | 2012/3/1 00:05:00 | Web Down | SVR0001 | |
| F0002 | 4 | 2012/3/20 00:00:00 | Web slow down | SVR0001 | |
| F0003 | 2 | 2012/3/26 00:10:00 | HDD Fault | SVR0003 | |
| ... | | | | | |

| ID | TYPE | DATE | CI id | ... |
|---|---|---|---|---|
| C0001 | del | 2012/3/13 10:31:02 | SVR0001 | |
| C0002 | add | 2012/3/13 10:35:28 | SVR0002 | |
| C0003 | mod | 2012/3/13 21:00:18 | SVR0003 | |
| ⋮ | | | | |

FIG. 8

| ID | TYPE | Alerttime | limittime | engine1 | engine2 | engine3 | range | occurred |
|---|---|---|---|---|---|---|---|---|
| 1 | 1 | 2012/3/26 00:00:00 | 2012/3/26 00:05:00 | YES | NO | NO | 1h | YES |
| 2 | 1 | 2012/3/26 00:05:00 | 2012/3/26 01:00:00 | YES | YES | NO | 1h | YES |
| 3 | 1 | 2012/3/26 00:10:00 | 2012/3/26 01:00:00 | YES | YES | YES | 1h | YES |
| 4 | 2 | 2012/3/27 00:00:00 | 2012/3/27 23:00:00 | YES | YES | YES | 24h | NO |
| 5 | 2 | 2012/3/27 01:00:00 | 2012/3/27 23:00:00 | YES | NO | YES | 24h | NO |
| 6 | 2 | 2012/3/27 02:00:00 | 2012/3/27 23:00:00 | YES | NO | NO | 24h | - |
| 7 | 1 | 2012/3/28 00:00:00 | 2012/3/28 01:00:00 | NO | NO | YES | 24h | - |

FIG. 9

| TYPE | range | engine1 | engine2 | engine3 | occurred | notoccurred | |
|---|---|---|---|---|---|---|---|
| 1 | 1h | YES | YES | YES | 10 | 2 | ~6011 |
| 2 | 1h | YES | YES | NO | 6 | 6 | |
| 1 | 1h | YES | NO | YES | 5 | 7 | |
| 1 | 1h | YES | NO | NO | 0 | 5 | |
| 2 | 24h | YES | YES | YES | 0 | 9 | |
| 1 | 24h | NO | NO | YES | 7 | 0 | ~6012 |
| 1 | 24h | YES | YES | NO | 0 | 7 | ~6013 |

FAILURE SYMPTOM REPORT DEVICE AND METHOD FOR DETECTING FAILURE SYMPTOM

CROSS-REFERENCE TO RELATED APPLICATION

This application is based upon and claims the benefit of priority of the prior Japanese Patent Application No. 2013-219914, filed on Oct. 23, 2013, and the Japanese Patent Application No. 2014-189926, filed on Sep. 18, 2014, the entire contents of which are incorporated herein by reference.

FIELD

The embodiments discussed herein are related to a failure symptom report device and a method for detecting a failure symptom.

BACKGROUND

A system such as a data center includes a large number of computers and performs data communication in response to an access from the outside. A system configuration of such a system includes a plurality of identical or similar partial configurations. The system configuration is frequently changed. For example, the configuration is changed due to replacement of the configuration equipment, revision of an application program, and the like. Under a cloud environment, addition of a new server, deletion of a server, and the like are also performed.

There is a method for detecting a failure that occurs in the configuration equipment by using a failure symptom pattern that indicates a symptom of the failure. Based on a log history and information of occurred failures, a combination of messages that has a high probability of co-occurrence with a failure is extracted as a failure symptom pattern. Then, it is determined that a failure is likely to occur when messages of the same combination as the failure symptom pattern are output from the configuration equipment.

There is a method for evaluating a failure that occurs in the configuration equipment by generating a model including pairs of a combination of events of a failure and a cause candidate of the failure, on the basis of information of analysis rules and information of devices to be managed. A corresponding model is obtained on the basis of a received combination of events of the failure.

Related techniques are disclosed in, for example, Japanese Laid-open Patent Publication No. 2006-146668, and Japanese Laid-open Patent Publication No. 2011-76293.

However, in the above-described technology, the failure symptom pattern is generated on the basis of the co-occurrence probability, so that there is a problem that a degree of an influence of change in the configuration equipment on the pattern is not clear, and it is difficult to determine whether or not application of the failure symptom pattern is appropriate. For example, when the failure symptom pattern is learned each time a change in the configuration equipment occurs, the leaning time becomes short, so that reliability of the generated failure symptom pattern is reduced.

There is another method for detecting a failure that occurs in the configuration equipment by using a plurality of detection engines for detecting failure symptoms. In the method, a message output from the configuration equipment is input to the respective detection engines. The results output from the respective detection engines are input to a majority circuit, and the output from the majority circuit is set as a final output.

In the above-described technology using the plurality of detection engines and the majority circuit, from among the results output from the detection engines, a result having the largest number is set as a final output. Thus, a characteristic of the detection engine with respect to an input and a condition associated with the input are not considered. For example, when a certain input is received by the plurality of detection engines, it is probable that not an output from a small number of detection engines that are good at analysis for the input, but an output from wrong detection engines that are more than the small number of detection engines is set as a final output.

In addition, in terms of a characteristic of a failure, it is desirable that a failure does not occur in commercial configuration equipment. Thus, there is a tendency that failure cases are reduced, and there is a failure symptom that is difficult to catch by an output result of the individual detection engine.

SUMMARY

According to an aspect of the present invention, provided is a failure symptom report device including a processor. The processor is configured to receive a message output from a system. The message is related to configuration equipment of the system. The processor is configured to detect presence or absence of each of a plurality of failure alerts. The plurality of failure alerts are generated in response to the received message on basis of a plurality of detection conditions respectively. The plurality of detection conditions are respectively defined in accordance with a plurality of different characteristics. The processor is configured to associate an actually occurred failure with a combination of the detected presence or absence of each of the plurality of failure alerts. The processor is configured to count performance of failure prediction for each combination of the detected presence or absence of each of the plurality of failure alerts. The processor is configured to determine presence or absence of a failure symptom on basis of the counted performance of failure prediction and a combination of presence or absence of each of the plurality of failure alerts generated in response to a currently received message.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of failure information stored in a CMDB;

FIG. 6 is a diagram illustrating an example of configuration change information stored in a CMDB;

FIG. 8 is a diagram illustrating an example of alert set information;

FIG. 9 is a diagram illustrating an example of a performance model;

DESCRIPTION OF EMBODIMENTS

Figure 1:
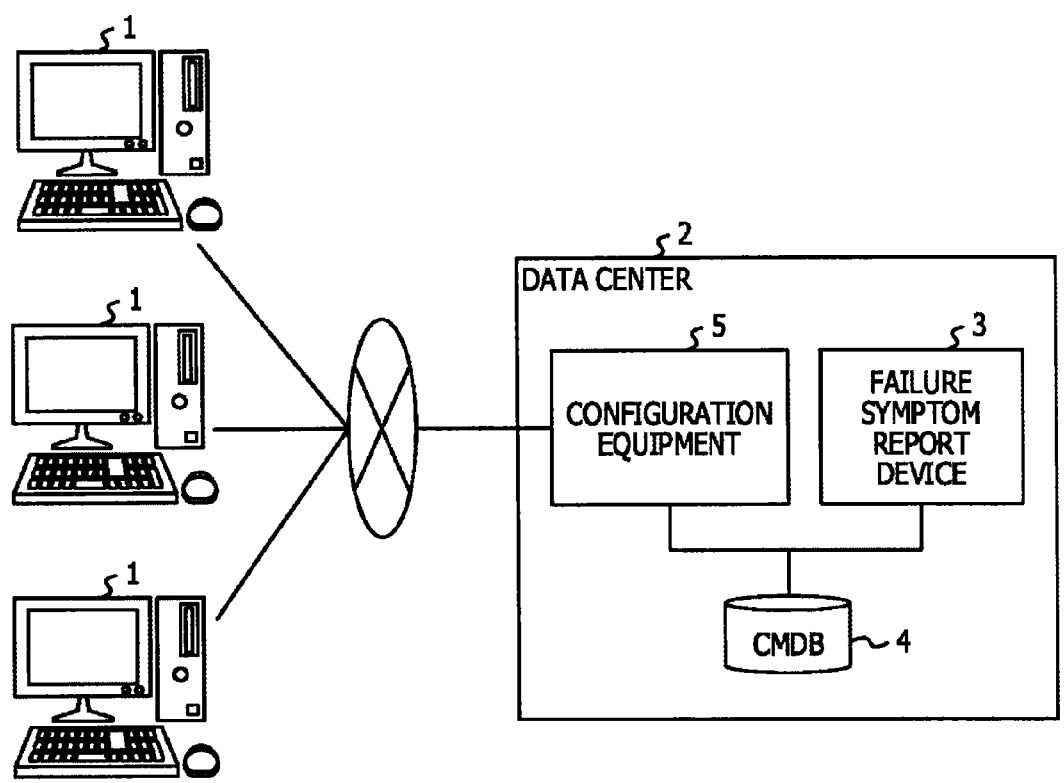
FIG. 1 is a diagram illustrating an exemplary configuration of a system.

FIG. 1 is a diagram illustrating an exemplary configuration of a system according to an embodiment. As illustrated in FIG. 1, the system includes a plurality of client terminals 1 and a data center 2. The system performs data communication in response to an access from each of the client terminals 1.

Each of the client terminals 1 is a terminal that accesses the data center 2 and receives service by using a cloud system. The data center 2 includes a failure symptom report device 3, a configuration management database (CMDB) 4, and configuration equipment 5.

The failure symptom report device 3 is a device that reports a symptom of a failure that occurs in information processing systems provided and monitored in the data center 2.

The CMDB 4 is a database that integrates and manages information related to a configuration of each of information processing systems provided in the data center 2. The CMDB 4 manages configuration items (CIs) included in each of the information processing systems, an attribute of each CI, failure information, and the like. An item that is managed as a CI is, for example, hardware, software, a document, service, asset, and the like.

The configuration equipment 5 includes a plurality of physical servers, and an information processing system is provided for each customer by operating a plurality of virtual machines on the configuration equipment 5.

Figure 2:
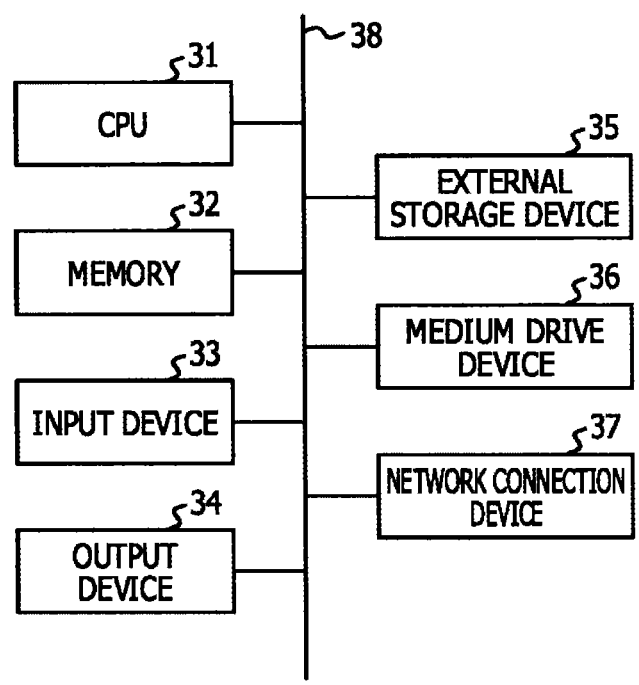
FIG. 2 is a diagram illustrating an exemplary configuration of a failure symptom report device.

FIG. 2 is a diagram illustrating an exemplary configuration of the failure symptom report device 3 according to the embodiment. The failure symptom report device 3 according to the embodiment includes a central processing unit (CPU) 31, a memory 32, an input device 33, an output device 34, an external storage device 35, a medium drive device 36, and a network connection device 37. The CPU 31, the memory 32, the input device 33, the output device 34, the external storage device 35, the medium drive device 36, and the network connection device 37 are connected to one another through a bus 38 to transmit and receive data therebetween. The CPU 31 is a calculation device that controls peripheral equipment, executes various pieces of software, and executes a program that achieves failure prediction according to the embodiment.

The memory 32 is a volatile storage device used to execute a program. As the memory 32, for example, a random access memory (RAM) or the like may be used.

The input device 33 is a unit through which data is input from the outside. As the input device 33, for example, a keyboard, a mouse, and the like may be used. The output device 34 is a device that outputs data and the like to a display device and the like. The output device 34 may include the display device.

The external storage device 35 is a non-volatile storage device that stores therein a program and data used to operate the failure symptom report device 3 and a program for achieving failure prediction according to the embodiment. As the external storage device, for example, a magnetic disk storage device, a flash memory drive, and the like may be used.

The medium drive device 36 outputs data stored in the memory 32 or the external storage device 35, to a portable storage medium such as a flexible disk, a magneto optical (MO) disk, a compact disc recordable (CD-R), and a digital versatile disc recordable (DVD-R). The medium drive device 36 also reads a program, data, and the like from the portable storage medium.

The network connection device 37 is a device for connecting the failure symptom report device 3 to a network.

Figure 3:
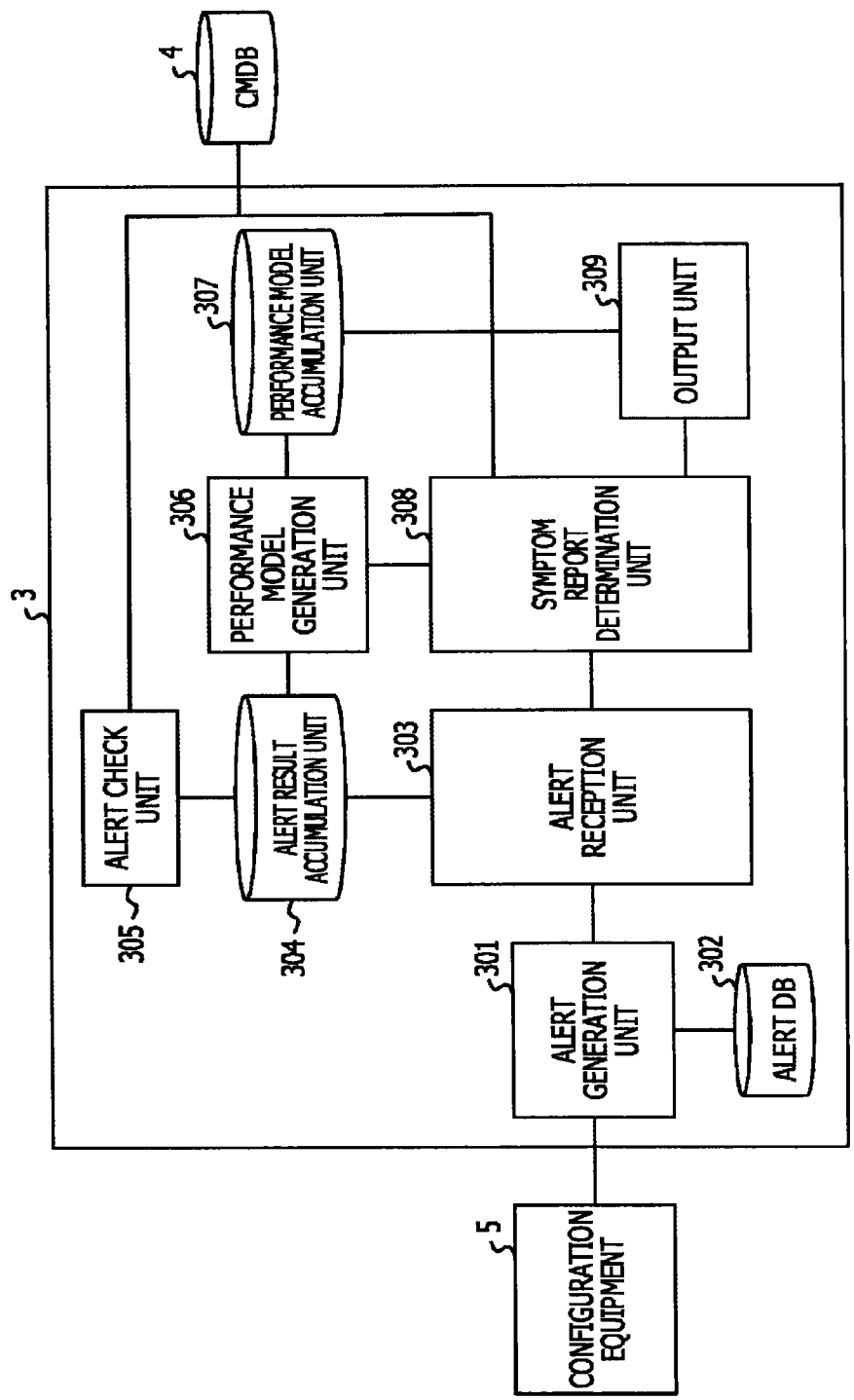
FIG. 3 is a diagram illustrating an exemplary functional configuration of a failure symptom report device.

FIG. 3 is a diagram illustrating an exemplary functional configuration of the failure symptom report device 3 illustrated in FIG. 1. The failure symptom report device 3 illustrated in FIG. 3 includes an alert generation unit 301, an alert database (DB) 302, an alert reception unit 303, an alert result accumulation unit 304, an alert check unit 305, a performance model generation unit 306, a performance model accumulation unit 307, a symptom report determination unit 308, and an output unit 309.

The alert generation unit 301 is realized, for example, by the CPU 31. The alert DB 302 is realized, for example, by the memory 32 or the external storage device 35. The alert reception unit 303 is realized, for example, by the CPU 31. The alert result accumulation unit 304 is realized, for example, by the memory 32 or the external storage device 35. The alert check unit 305 is realized, for example, by the CPU 31. The performance model generation unit 306 is realized, for example, by the CPU 31. The performance model accumulation unit 307 is realized, for example, by the memory 32 or the external storage device 35. The symptom report determination unit 308 is realized, for example, by the CPU 31. The output unit 309 is realized, for example, by the CPU 31.

The alert generation unit 301 receives a message from the configuration equipment 5. The alert generation unit 301 includes a plurality of detection engines. Each of the plurality of detection engines generates an alert in response to the received message, on the basis of a condition provided in the detection engine beforehand. The alert generation unit 301 outputs the generated alert to the alert reception unit 303. The message is data that includes a property generated in each CI or between CIs during the operation of the configuration equipment 5. For example, in the alert generation unit 301, a certain detection engine may generate an alert on the basis of information included in the received message, which indicates the rotational speed of a hard disc drive (HDD). Another detection engine may generate an alert on the basis of information included in the received message, which indicates a temperature of a server. Yet another detection engine may generate an alert on the basis of information included in the received message, which indicates the rotational speed of a fan in a server.

Hereinafter, it is assumed that the alert generation unit 301 includes three detection engines (engine1, engine2, and engine3). However, the number of detection engines is not limited to such an example.

The alert DB 302 is a database in which the alert generation unit 301 stores an alert generated by each of the detection engines.

The alert reception unit 303 receives an alert from the alert generation unit 301. The alert reception unit 303 outputs information related to presence or absence of an alert output from each of the detection engines to the alert result accumulation unit 304 and the symptom report determination unit 308.

The alert result accumulation unit 304 stores therein the information related to presence or absence of the alert of each of the detection engines, which is output from the alert reception unit 303, in association with failure information identified by the alert check unit 305 (described later).

The alert check unit 305 checks the information related to presence or absence of the alert of each of the detection engines, which is stored in the alert result accumulation unit 304, against failure information stored in the CMDB 4, and identifies failure information that corresponds to the combination of presence or absence of the alert of each of the detection engines. The information related to presence or absence of the alert of each of the detection engines and the identified failure information are output to the alert result accumulation unit 304.

The performance model generation unit 306 generates a model in which the information related to presence or absence of the alert of each of the detection engines is associated with presence or absence of the corresponding failure, on the basis of the failure information and the like stored in the alert result accumulation unit 304 and the CMDB 4.

The performance model accumulation unit 307 stores therein the model generated by the performance model generation unit 306.

The symptom report determination unit 308 checks the information related to presence or absence of the alert output from each of the detection engines, which is output from the alert reception unit 303, against the model generated by the performance model generation unit 306, and finally determines whether or not a symptom is to be reported.

The output unit 309 outputs the result determined by the symptom report determination unit 308.

FIG. 4 is a diagram illustrating an example of failure information stored in the CMDB 4. In failure information 1000, records having an item "ID" 1001, an item "Type" 1002, an item "Date" 1003, an item "Title" 1004, and an item "CI ID" 1005 are stored.

The item "ID" 1001 is an individual value assigned to each of the records of the failure information 1000. The item "Type" 1002 indicates a type of failure which has occurred in a CI in the configuration equipment 5. The item "date" 1003 indicates a date and time of occurrence of the failure in the CI in the configuration equipment 5. The item "title" 1004 indicates a content of the failure which has occurred in the CI in the configuration equipment 5. The item "CI ID" 1005 indicates identification information of the CI in which the failure has occurred.

In the failure information 1000 in FIG. 4, for example, a record 1011 having an identifier (ID) value of "F0001" indicates a failure of a code number "1" has occurred in "SVR0001" at "2012/3/1 00:05:00", and caused "Web Down".

Figure 5:
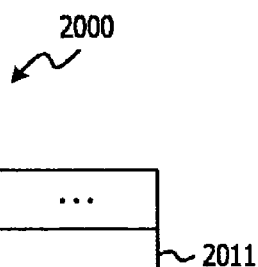
FIG. 5 is a diagram illustrating an example of configuration information stored in a CMDB.

FIG. 5 is a diagram illustrating an example of configuration information stored in the CMDB 4. In configuration information 2000, records having an item "ID" 2001, an item "CI type" 2002, an item "Host Name" 2003, and an item "IP address" 2004 are stored.

The item "ID" 2001 is an individual value assigned to each of the records of the configuration information 2000. The item "CI type" 2002 indicates a type of CI in the configuration equipment 5. The item "Host Name" 2003 indicates a host name of the CI in the configuration equipment 5. The item "IP address" 2004 indicates an address that is assigned to the CI in the configuration equipment 5.

In the configuration information 2000 in FIG. 5, for example, a record 2011 having an ID value of "SVR0001" indicates a CI having "Server" as a type, "10.0.0.1" as an Internet Protocol (IP) address, and "Web1" as a host name.

FIG. 6 is a diagram illustrating an example of configuration change information stored in the CMDB 4. In configuration change information 3000, records having an item "ID" 3001, an item "Type" 3002, an item "Date" 3003, and an item "CI ID" 3004 are stored.

The item "ID" 3001 is an individual value assigned to each of the records of the configuration change information 3000. The item "Type" 3002 indicates a type of change occurred in a CI in the configuration equipment 5. The item "Date" 3003 indicates a date and time at which the change has occurred. The item "CI ID" 3004 indicates identification information of the CI.

In the configuration change information 3000 in FIG. 6, for example, a record 3011 having an ID value of "C0001" indicates a change "DEL" has occurred in a server "SVR0001" at "2012/3/13 10:31:02".

As described above, in the CMDB 4, a CI included in each of the information processing systems provided in the data center 2, a change in a CI included in each of the information processing systems provided in the data center 2, and a failure that has occurred in each of the information processing systems provided in the data center 2 are managed.

Figure 7:
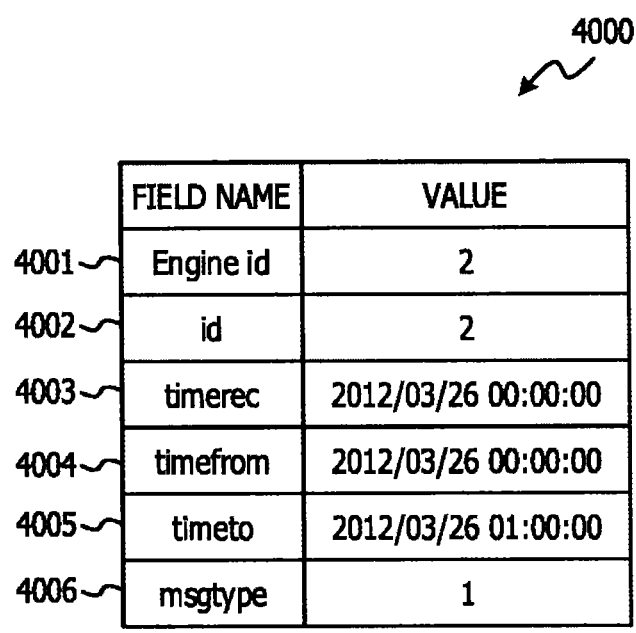
FIG. 7 is a diagram illustrating an example of an alert.

FIG. 7 is a diagram illustrating an example of an alert output from the alert generation unit 301. In FIG. 7, an alert 4000 includes an item "Engine ID" 4001, an item "ID" 4002, an item "timerec" 4003, an item "timefrom" 4004, an item "timeto" 4005, and an item "msgtype" 4006.

The item "Engine ID" 4001 indicates a detection engine that has generated the alert 4000. The item "ID" 4002 is an individual code that indicates the alert 4000. The item "timerec" 4003 indicates a time at which the alert has been generated. The item "timefrom" 4004 indicates a start time of a valid time period of the alert. The item "timeto" 4005 indicates an end time of the valid time period of the alert. The item "msgtype" 4006 is a code that indicates the type of failure that may occur in a CI in the configuration equipment 5.

In the example of FIG. 7, for example, it is indicated that "engine2" has generated the alert having a code number "2" at "2012/3/26 00:00:00". The alert is related to a failure of a code number "1" and is valid between "2012/3/26 00:00:00" and "2012/3/26 01:00:00".

FIG. 8 is a diagram illustrating an example of alert set information stored in the alert result accumulation unit 304. In alert set information 5000, records having an item "ID" 5001, an item "Type" 5002, an item "Alerttime" 5003, an item "limittime" 5004, items "engine1", "engine2", and "engine3" 5005, an item "range" 5006, and an item "occurred" 5007 are stored.

The item "ID" 5001 is a serial value assigned to each of the records of the alert set information 5000. The item "Type" 5002 indicates the type of failure that may occur in a CI in the configuration equipment 5. The item "Alerttime" 5003 indicates a date and time at which a valid time period of the alert starts. The item "limittime" 5004 indicates a date and time at which the valid time period of the alert ends. The items "engine1", "engine2", and "engine3" 5005 respectively indicates whether the engine1, the engine2, and the engine3 generate alerts. The item "range" 5006 indicates a time elapsed after a change has occurred in a CI in the configuration equipment 5. The item "occurred" 5007 indicates whether or not a failure has actually occurred for the combination of presence or absence of the alerts generated by the engine1, the engine2, and the engine3.

In the alert set information 5000 in FIG. 8, for example, a record 5011 having an ID value of "1" indicates that when "1" hour has elapsed after a change has occurred in a CI in the configuration equipment 5, the engine1 has output a result estimating occurrence of a failure and the engine2 and the engine3 have not output results estimating occurrence of a failure, and a failure has actually occurred within a valid time period between "2012/3/26 00:00:00" and "2012/3/26 00:05:00".

FIG. 9 is a diagram illustrating an example of a performance model stored in the performance model accumulation unit 307. As illustrated in FIG. 9, in a performance model 6000, records having an item "Type" 6001, an item "range" 6002, items "engine1", "engine2", and "engine3" 6003, an item "occurred" 6004, and an item "notoccurred" 6005 are stored.

The item "Type" 6001 is a value that indicates the type of failure that may occur in a CI in the configuration equipment 5. The item "range" 6002 indicates a time elapsed after a change has occurred in a CI in the configuration equipment 5. The items "engine1", "engine2", and "engine3" 6003 respectively indicate whether the engine1, the engine2, and the engine3 has generated alerts. The item "occurred" 6004 and the item "notoccurred" 6005 respectively indicate that the number of cases in which a failure has actually occurred and has not occurred for each certain combination of presence or absence of the alerts generated by the engine1, the engine2, and the engine3.

In the performance model 6000 in FIG. 9, for example, a record 6011 relates to a failure of the type "1" and indicates that a time elapsed after a change has occurred in a CI in the configuration equipment 5 is "one hour". The record 6011 also indicates that in a case in which the engine1, the engine2, and the engine3 respectively output results estimating occurrence of the failure, the failure has actually occurred "10 times", and has not occurred "twice".

Here, the items "engine1", "engine2", and "engine3" 6003, the item "occurred" 6004, and the item "notoccurred" 6005 are considered. For example, according to a record 6012 of the performance model 6000, the engine1 and the engine2 have not output results estimating occurrence of a failure of the type "1" and only the engine3 has output a result estimating occurrence of the failure, and the failure has actually occurred "7 times". According to a record 6013, the engine1 and the engine2 have output results estimating occurrence of the failure and the engine3 has not output a result estimating occurrence of a failure of the type "1", and the failure has not actually occurred. There may be no correlation between the number of detection engines that have output alerts and the number of occurrence of the failure. By counting whether a failure has actually occurred for each combination of presence or absence of alerts generated by the engine1, the engine2, and the engine3, the accuracy of detecting failure symptoms may be improved.

An operation of the failure symptom report device 3 is described below. The operation of the failure symptom report device 3 includes failure alert generation processing, performance model generation processing, and symptom report determination processing. In the failure alert generation processing, a failure alert is generated in response to a message, which is related to the configuration equipment and output from the system to be monitored, on the basis of a plurality of detection conditions that are respectively defined in accordance with a plurality of different characteristics of the system. In the performance model generation processing, actually occurred failures are respectively associated with presence or absence of a plurality of failure alerts on the basis of the plurality of detection conditions, and failure prediction performance is counted for each combination of presence or absence of the plurality of failure alerts. In the symptom report determination processing, presence or absence of a failure symptom is determined on the basis of a combination of presence or absence of the plurality of failure alerts, which have been generated on the basis of the plurality of detection conditions, and the failure prediction performance. The details of the failure alert generation processing, the performance model generation processing, and the symptom report determination processing are described below.

Figure 10:
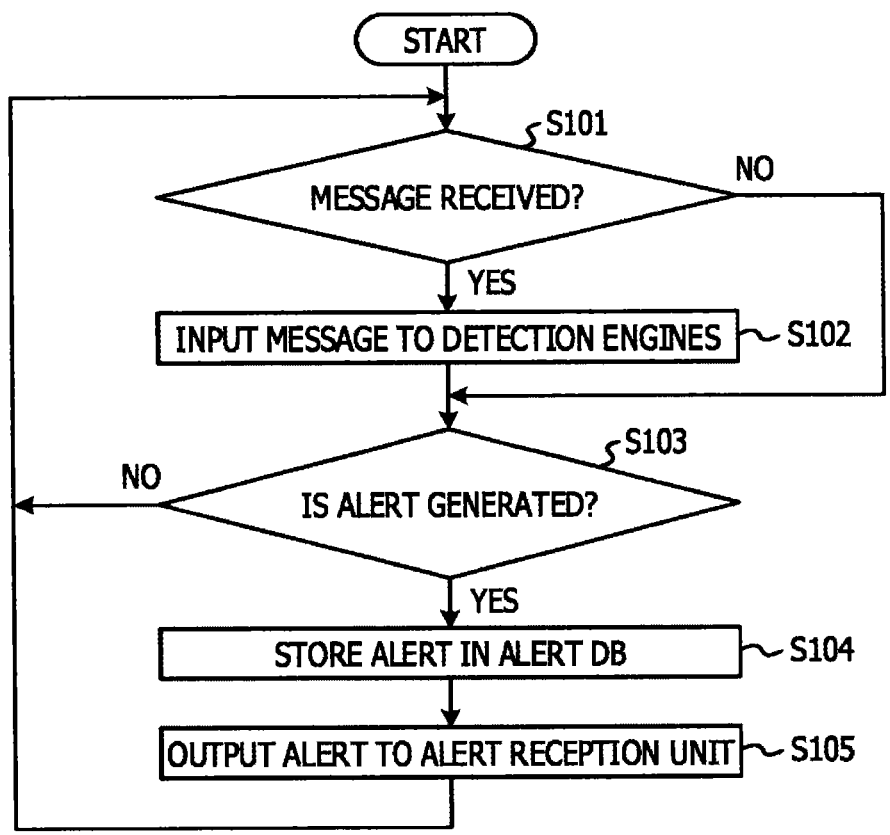
FIG. 10 is a diagram illustrating an exemplary flowchart of an operation of an alert generation unit.

An example of the failure alert generation processing of the failure symptom report device 3 according to the embodiment is described below with reference to the flowchart illustrated in FIG. 10 and the alert 4000 in FIG. 7.

In S101, the alert generation unit 301 determines whether a message is received. When the alert generation unit 301 determines that a message is received (Yes in S101), the flow proceeds to S102. When the alert generation unit 301 determines that no message is received (No in S101), the flow proceeds to S103.

In S102, the alert generation unit 301 inputs the received message to the respective detection engines. Each of the detection engines generates an alert in a format of the alert 4000 in response to the received message. For example, in the alert in the format of the alert 4000 in FIG. 7, each of the detection engines generates the item "timefrom" 4004 and the item "timeto" 4005 on the basis of time information included in the message. In addition, each of the detection engines generates the item "msgtype" 4006 on the basis of the message or a combination of a plurality of messages.

In S103, the alert generation unit 301 determines presence or absence of an alert generated by a detection engine in response to the input message. When the alert generation unit 301 determines that there is an alert generated by a detection engine (Yes in S103), the flow proceeds to S104. When the alert generation unit 301 determines that there is no alert generated by a detection engine (No in S103), the flow proceeds to S101.

In S104, the alert generation unit 301 stores the alert generated by the detection engine in the alert DB 302.

In S105, the alert generation unit 301 outputs the alert to the alert reception unit 303.

An example of the performance model generation processing of the failure symptom report device 3 according to the embodiment is described with reference to flowcharts illustrated in FIGS. 11, 12, and 13, the failure information 1000 in FIG. 4, the configuration change information 3000 in FIG. 6, the alert 4000 in FIG. 7, the alert set information 5000 in FIG. 8, and the performance model 6000 in FIG. 9.

Figure 11:
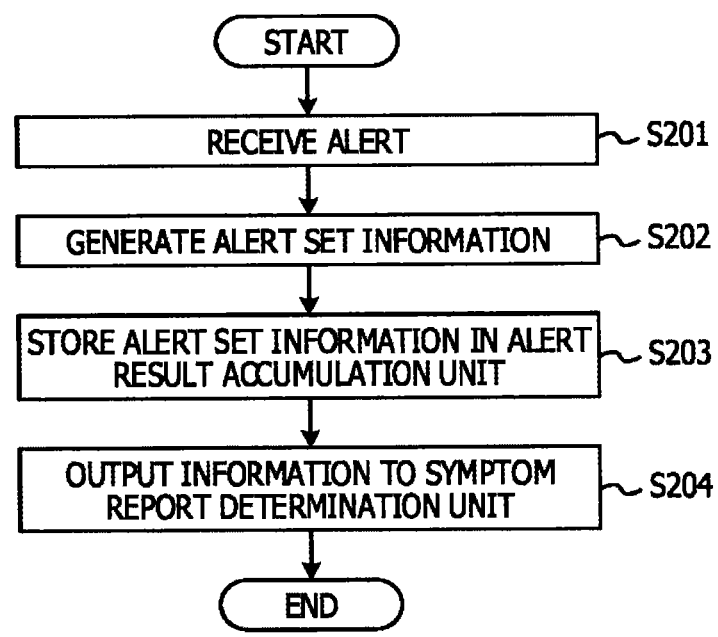
FIG. 11 is a diagram illustrating an exemplary flowchart of an operation of an alert reception unit.

FIG. 11 is a diagram illustrating an exemplary flowchart of an operation of the alert reception unit 303.

In S201, the alert reception unit 303 receives an alert, which is generated in the format of the alert 4000 and output from the alert generation unit 301.

In S202, the alert reception unit 303 generates a new record of the alert set information 5000 on the basis of the received alert. Specifically, in the alert set information 5000 in FIG. 8, the alert reception unit 303 generates a new record and sets information in the item "Type" 5002 on the basis of the item "msgtype" 4006. The alert reception unit 303 sets information in the item "Alerttime" 5003 on the basis of the item "timefrom" 4004. The alert reception unit 303 sets information in the item "limittime" 5004 on the basis of the item "timeto" 4005. The alert reception unit 303 sets "YES" in a corresponding item among the items "engine1", "engine2", and "engine3" 5005 on the basis of the item "Engine ID" 4001. With regard to items corresponding to other detection engines, the alert reception unit 303 sets "YES" in the corresponding item of the new record, only when there is, in existing alert set information, a valid record having "YES" in the corresponding item among the items "engine1", "engine2", and "engine3" 5005 and the item "Type" 5002 that matches the item "msgtype" 4006. Here, the valid record means a record having the item "Alerttime" 5003 and the item "limittime" 5004 such that the current date and time is included within a time period from a value of the item "Alerttime" 5003 to a value of the item "limittime" 5004. The alert reception unit 303 also calculates an elapsed time from a date and time of the latest change occurred in a CI in the configuration equipment 5 to the current date and time on the basis of the configuration change information 3000, and sets a value in the item "range" 5006 on the basis of the calculated elapsed time. For the item "range" 5006, time ranges such as "one hour, 24 hours, 168 hours, and more" are defined beforehand. The item "range" 5006 is set depending on a time range that corresponds to the calculated elapsed time. Here, "one hour" indicates a time that is 0 or more but less than one hour, "24 hours" indicates a time that is one hour or more but less than 24 hours, and "168 hours" indicates a time that is 24 hours or more but less than 168 hours. There is a correlation between a time elapsed since a change has occurred in a CI in the configuration equipment 5 and a probability of occurrence of a failure in the CIs of the configuration equipment 5, so that failures may be classified for each of the time ranges. The alert reception unit 303 sets information in the item "Type" 5002, the item "Alerttime" 5003, the item "limittime" 5004, the items "engine1", "engine2", and "engine3" 5005, and the item "range" 5006 of the new record, and does not set information in the item "occurred" 5007 of the new record. This state of the new record indicates that the record is not yet checked by the alert check unit 305. For example, in the alert set information 5000 in FIG. 8, records 5012 and 5013 correspond to records in such a state.

In S203, the alert reception unit 303 stores the generated record of alert set information 5000 in the alert result accumulation unit 304.

In S204, the alert reception unit 303 outputs information set in the item "Type" 5002, and the items "engine1", "engine2", and "engine3" 5005, to the symptom report determination unit 308.

As described above, a failure symptom may be caught using a plurality of criteria by generating a combination of presence or absence of failure alerts generated on the basis of different conditions prepared beforehand in response to the message that is related to the configuration equipment and is output from the system to be monitored.

Figure 12:
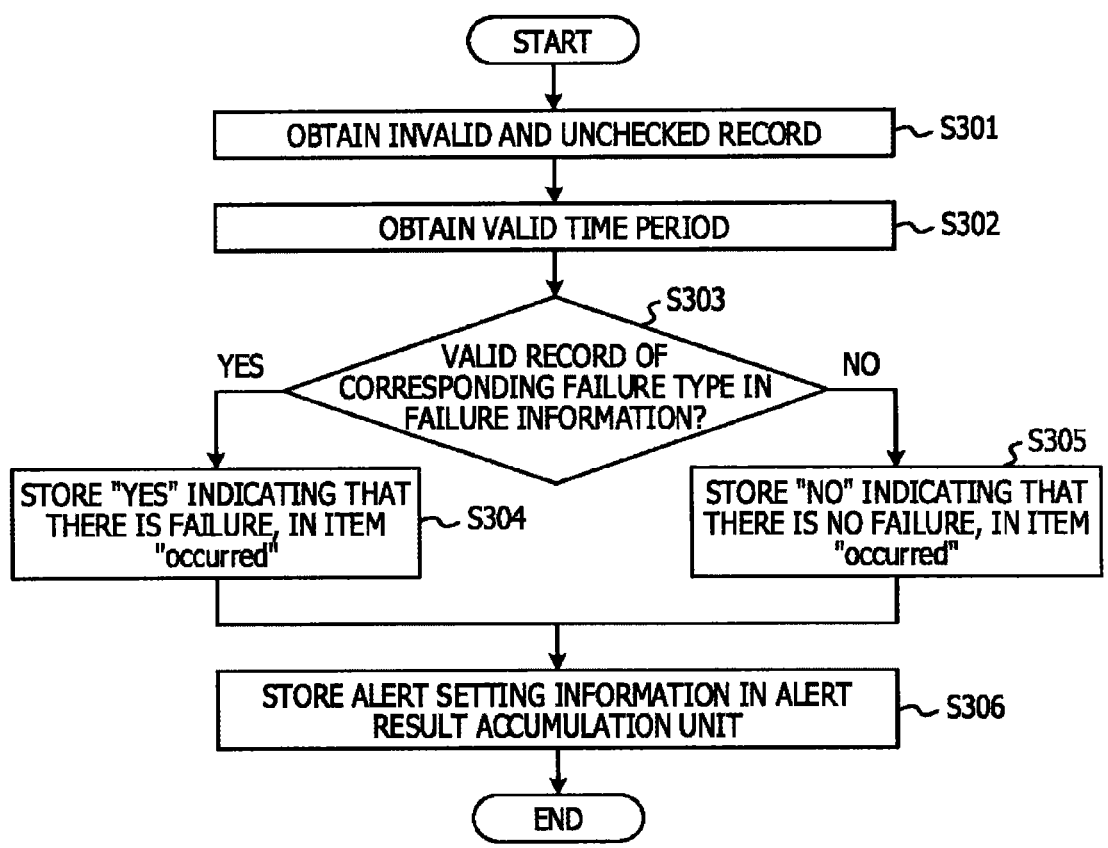
FIG. 12 is a diagram illustrating an exemplary flowchart of an operation of an alert check unit.

FIG. 12 is a diagram illustrating an exemplary flowchart of an operation of the alert check unit 305.

In S301, the alert check unit 305 obtains the alert set information 5000 stored in the alert result accumulation unit 304. The alert check unit 305 obtains an invalid and unchecked record of the alert set information 5000. Specifically, the alert check unit 305 selects records having the item "limittime" 5004 indicating the date and time before the current date and time. The alert check unit 305 obtains, from among the selected records, a record having the item "occurred" 5007 in which no information is set.

In S302, the alert check unit 305 obtains a valid time period on the basis of the obtained record of the alert set information 5000. Specifically, in the obtained record of the alert set information 5000, the alert check unit 305 refers to the contents of the item "Alerttime" 5003 and the item "limittime" 5004. The alert check unit 305 determines, as the valid time period, a time period from the date and time set in the item "Alerttime" 5003 to the date and time set in the item "limittime" 5004.

In S303, the alert check unit 305 determines, on the basis of the item "Type" 5002 and the obtained valid time period, whether there is a corresponding record in the failure information 1000 stored in the CMDB 4. Specifically, the alert check unit 305 refers to the item "Type" 1002 and the item "date" 1003 of a record of the failure information 1000. Then, the alert check unit 305 determines whether the item "Type" 1002 matches the item "Type" 5002 and whether the date and time set in the item "date" 1003 is within the valid time period.

When the alert check unit 305 determines that there is a record of the failure information 1000, which includes the item "Type" 1002 matching the item "Type" 5002 and the item "date" 1003 within the valid time period (Yes in S303), the flow proceeds to S304. When the alert check unit 305 determines that there is no record of the failure information 1000, which includes the item "Type" 1002 matching the item "Type" 5002 and the item "date" 1003 within the valid time period (No in S303), the flow proceeds to S305.

In S304, the alert check unit 305 sets "YES" indicating that a failure has occurred, in the item "occurred" 5007 of the obtained record of the alert set information 5000.

In S305, the alert check unit 305 sets "NO" that indicates that no failure has occurred, in the item "occurred" 5007 of the obtained record of the alert set information 5000.

In S306, the alert check unit 305 stores the record in the alert set information 5000, and stores the alert set information 5000 in the alert result accumulation unit 304.

Figure 13A:
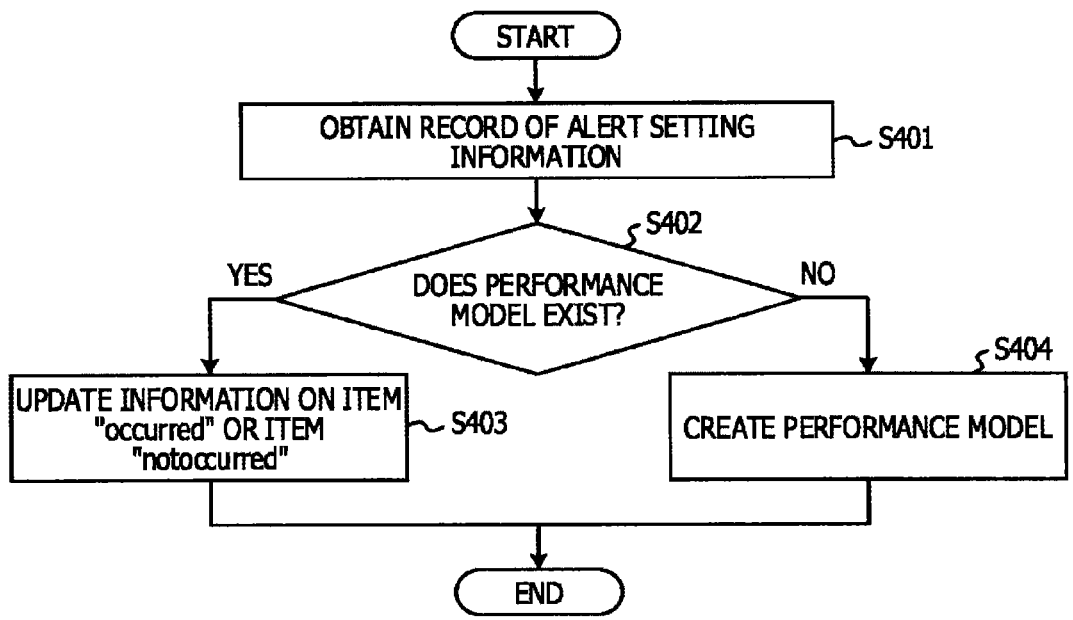
FIGS. 13A and 13B are diagrams illustrating exemplary flowcharts of an operation of a performance model generation unit.
Figure 13B:
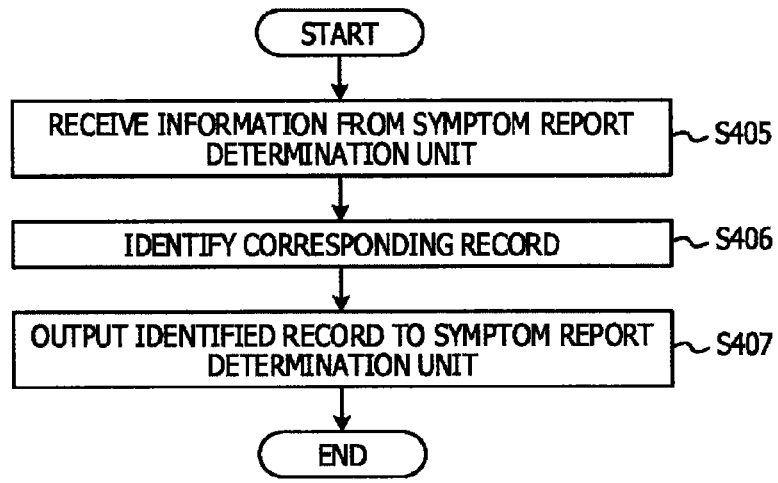

FIGS. 13A and 13B are diagrams illustrating exemplary flowcharts of an operation of the performance model generation unit 306. FIG. 13A illustrates an operation flow of the performance model generation processing. FIG. 13B illustrates an operation flow of processing for providing information of performance model to the symptom report determination unit 308.

In S401, the performance model generation unit 306 obtains a record of the alert set information 5000. Specifically, the performance model generation unit 306 obtains the record of the alert set information 5000 on the basis of the item "ID" 5001 assigned to the record of the alert set information 5000. At that time, the performance model generation unit 306 does not obtain a record having the item "ID" 5001 whose value is the same as that of an ever obtained record.

In S402, the performance model generation unit 306 determines whether or not a record of the performance model 6000 that corresponds to the obtained record of the alert set information 5000 exists. Specifically, the performance model generation unit 306 refers to information set in the item "Type" 5002, the items "engine1", "engine2", and "engine3" 5005, the item "range" 5006, and the item "occurred" 5007 of the obtained record of the alert set information 5000. The performance model generation unit 306 refers to the performance model 6000 stored in the performance model accumulation unit 307 using the referred information of the item "Type" 5002, the items "engine1", "engine2", and "engine3" 5005, and the item "range" 5006 as keys. At that time, the performance model generation unit 306 determines presence or absence of a record having the item "Type" 6001, the items "engine1", "engine2", and "engine3" 6003, and the item "range" 6002 in the performance model 6000, which includes the similar information to the item "Type" 5002, the items "engine1", "engine2", and "engine3" 5005, and the item "range" 5006, respectively.

When the performance model generation unit 306 determines that there is a record including the similar information (Yes in S402), the flow proceeds to S403. When the performance model generation unit 306 determines that there is no record including the similar information (No in S402), the flow proceeds to S404.

In S403, the performance model generation unit 306 updates information set in the item "occurred" 6004 or the item "notoccurred" 6005 of the record of the performance model 6000. Specifically, the performance model generation unit 306 obtains the record of the performance model 6000, which is determined to include the similar information. The performance model generation unit 306 updates the information set in the item "occurred" 6004 or the item "notoccurred" 6005 of the record of the performance model 6000, on the basis of the obtained content of the item "occurred" 5007 of the record of the alert set information 5000. At that time, when the content of the item "occurred" 5007 of the record of the alert set information 5000 corresponds to "YES", the performance model generation unit 306 increments a number stored in the item "occurred" 6004 of the record of the performance model 6000. When the content of the item "occurred" 5007 of the record of the alert set information 5000 corresponds to "NO", the performance model generation unit 306 increments a number stored in the item "notoccurred" 6005 of the record of the performance model 6000. After that, the performance model generation unit 306 stores the performance model 6000 in the performance model accumulation unit 307.

In S404, the performance model generation unit 306 creates a new record of the performance model 6000 on the basis of the obtained record of the alert set information 5000. On the basis of the contents of the item "Type" 5002, the items "engine1", "engine2", and "engine3" 5005, and the item "range" 5006 of the obtained record of the alert set information 5000, the performance model generation unit 306 first sets the item "Type" 6001, the items "engine1", "engine2", and "engine3" 6003, and the item "range" 6002 of the new record of the performance model 6000. When the content of the item "occurred" 5007 of the obtained record of the alert set information 5000 corresponds to "YES", the performance model generation unit 306 sets a number "1" in the item "occurred" 6004 of the new record of the performance model 6000. When the content of the item "occurred" 5007 of the obtained record of the alert set information 5000 corresponds to "NO", the performance model generation unit 306 sets the number "1" in the item "notoccurred" 6005 of the new record of the performance model 6000. After that, the performance model generation unit 306 stores the new record of the performance model 6000 in the performance model accumulation unit 307.

In S405, the performance model generation unit 306 receives information output from the symptom report determination unit 308, that is, information set in the item "Type" 5002, the items "engine1", "engine2", and "engine3" 5005, and an item "range" in which a time elapsed after a change has occurred in a CI in the configuration equipment 5 is set.

In S406, the performance model generation unit 306 obtains the performance model 6000 from the performance model accumulation unit 307 and identifies a record using the received information set in the item "Type" 5002, the items "engine1", "engine2", and "engine3" 5005, and the item "range" as keys. Specifically, the performance model generation unit 306 identifies a record having the item "Type" 6001, the items "engine1", "engine2", and "engine3" 6003, and the item "range" 6002 that match information set in the item "Type" 5002, the items "engine1", "engine2", and "engine3" 5005, and the item "range", respectively.

In S407, the performance model generation unit 306 outputs the identified record of the performance model 6000 to the symptom report determination unit 308.

As described above, by associating an actually occurred failure with a combination of presence or absence of the plurality of failure alerts generated on the basis of the plurality of detection conditions, and counting failure prediction performance for each combination of presence or absence of the plurality of failure alerts, even a failure symptom, which is difficult to catch by an output result of the individual detection engine, may be caught appropriately by a combination of output results of the plurality of detection engines.

An example of the symptom report determination processing of the failure symptom report device 3 according to the embodiment is described below with reference to the flowchart illustrated in FIG. 14, the failure information 1000 in FIG. 4, the configuration change information 3000 in FIG. 6, the alert set information 5000 in FIG. 8, and the performance model 6000 in FIG. 9.

Figure 14:
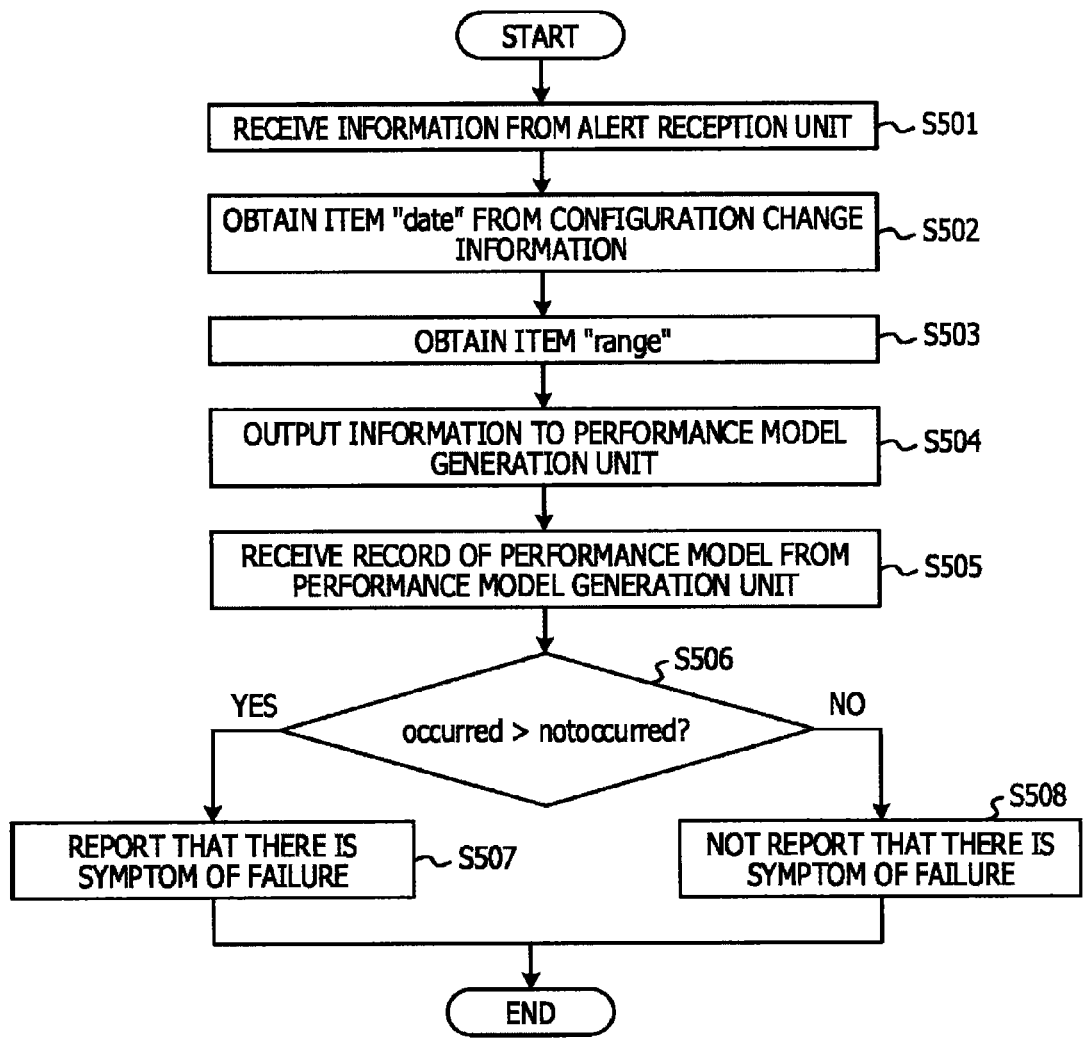
FIG. 14 is a diagram illustrating an exemplary flowchart of an operation of a symptom report determination unit.

FIG. 14 is a diagram illustrating an exemplary flowchart of an operation of the symptom report determination unit 308.

In S501, the symptom report determination unit 308 receives the information set in the item "Type" 5002 and the items "engine1", "engine2", and "engine3" 5005 of a record of the alert set information 5000, from the alert reception unit 303.

In S502, the symptom report determination unit 308 obtains the latest value of the item "Date" 3003 from records of the configuration change information 3000.

In S503, the symptom report determination unit 308 sets in an item "range", on the basis of the item "Date" 3003, a time elapsed after a change has occurred in a CI in the configuration equipment 5. Specifically, the item "range" is a time calculated on the basis of a difference between the current date and time and the date and time of the item "Date" 3003. For the item "range", time ranges such as "one hour, 24 hours, 168 hours, and more" are defined beforehand. The value of the item "range" is set depending on a time range that corresponds to the calculated time. Here, "one hour" indicates a time that is 0 or more but less than one hour, "24 hours" indicates a time that is one hour or more but less than 24 hours, and "168 hours" indicates a time that is 24 hours or more but less than 168 hours. There is a correlation between a time elapsed since a change has occurred in a CI in the configuration equipment 5 and a probability of occurrence of a failure in the CIs of the configuration equipment 5, so that failures may be classified for each of the time ranges.

In S504, the symptom report determination unit 308 outputs information set in the item "Type" 5002, the items "engine1", "engine2", and "engine3" 5005, and the item "range", to the performance model generation unit 306.

In S505, the symptom report determination unit 308 receives a record of the performance model 6000 in FIG. 9, from the performance model generation unit 306.

In S506, the symptom report determination unit 308 refers to the item "occurred" 6004 and the item "notoccurred" 6005 of the received record, and determines whether a number set in the item "occurred" 6004 is larger than a number set in the item "notoccurred" 6005. When the symptom report determination unit 308 determines that the number set in the item "occurred" 6004 is larger than the number set in the item "notoccurred" 6005 (Yes in S506), the flow proceeds to S507. When the symptom report determination unit 308 determines that the number set in the item "occurred" 6004 is not larger than the number set in the item "notoccurred" 6005 (No in S506), the flow proceeds to S508.

In S507, the symptom report determination unit 308 reports to the output unit 309 that there is a symptom of a failure in the system to be monitored.

In S508, the symptom report determination unit 308 does not report to the output unit 309 that there is a symptom of a failure in the system to be monitored.

As described above, a failure may be predicted appropriately by determining presence or absence of a failure symptom on the basis of a combination of results detected in response to the message on the basis of the plurality of detection conditions and the failure prediction performance. Determination accuracy of a failure symptom may be improved by determining on the basis of a time elapsed after a change has occurred in a CI in the configuration equipment. Validity of combination of results output from the respective detection engines may be determined by a criterion in which the performance is considered, so that the determination accuracy may be improved. The record of the alert set information 5000 and the record of the performance model 6000 may be generated for each CI or each type of CI. In such a case, each record of the alert set information 5000 and the performance model 6000 includes an item indicating identification information of the CI or the type of CI. The time elapsed since the latest change in a CI is calculated for each CI or each type of CI. With this configuration, failure symptoms are detected depending on different criteria for respective CIs or respective types of CI, thus the accuracy of detecting failure symptoms may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A failure symptom report device, comprising:
a processor configured to
receive a message output from a system, the message being related to configuration equipment of the system,
detect presence or absence of each of a plurality of failure alerts, the plurality of failure alerts being generated in response to the received message on basis of a plurality of detection conditions respectively, the plurality of detection conditions being respectively defined in accordance with a plurality of different characteristics,
associate an actually occurred failure with a combination of the detected presence or absence of each of the plurality of failure alerts,
maintain a count value corresponding to performance of failure prediction for each combination of the detected presence or absence of each of the plurality of failure alerts, the count value being incremented based on whether an actually occurred failure is associated with each of the plurality of failure alerts, and
determine presence or absence of a failure symptom on basis of the count value corresponding to performance of failure prediction and a combination of presence or absence of each of the plurality of failure alerts generated in response to a currently received message.

2. The failure symptom report device according to claim 1, wherein
the processor is configured to maintain the count value corresponding to performance of failure prediction for each range of time elapsed after a change occurs in the configuration equipment.

3. A method for detecting a failure symptom, the method comprising:
receiving, by a computer, a message output from a system, the message being related to configuration equipment of the system;
detecting presence or absence of each of a plurality of failure alerts, the plurality of failure alerts being generated in response to the received message on basis of a plurality of detection conditions respectively, the plurality of detection conditions being respectively defined in accordance with a plurality of different characteristics;
associating an actually occurred failure with a combination of the detected presence or absence of each of the plurality of failure alerts;
maintaining a count value corresponding to performance of failure prediction for each combination of the detected presence or absence of each of the plurality of failure alerts, the count value being incremented based on whether an actually occurred failure is associated with each of the plurality of failure alerts, and
determining presence or absence of a failure symptom on basis of the count value corresponding to performance of failure prediction and a combination of presence or absence of each of the plurality of failure alerts generated in response to a currently received message.

4. The method according to claim 3, wherein
the computer maintains the count value corresponding to performance of failure prediction for each range of time elapsed after a change occurs in the configuration equipment.

5. A non-transitory computer-readable recording medium having stored therein a program for causing a computer to execute a process, the process comprising:

receiving a message output from a system, the message being related to configuration equipment of the system;

detecting presence or absence of each of a plurality of failure alerts, the plurality of failure alerts being generated in response to the received message on basis of a plurality of detection conditions respectively, the plurality of detection conditions being respectively defined in accordance with a plurality of different characteristics;

associating an actually occurred failure with a combination of the detected presence or absence of each of the plurality of failure alerts;

maintaining a count value corresponding to performance of failure prediction for each combination of the detected presence or absence of each of the plurality of failure alerts, the count value being incremented based on whether an actually occurred failure is associated with each of the plurality of failure alerts, and determining presence or absence of a failure symptom on basis of the count value corresponding to performance of failure prediction and a combination of presence or absence of each of the plurality of failure alerts generated in response to a currently received message.

6. The non-transitory computer-readable recording medium according to claim 5, wherein the program causes the computer to maintain the count value corresponding to performance of failure prediction for each range of time elapsed after a change occurs in the configuration equipment.

* * * * *